W. L. MONRO.
METHOD OF DRAWING HOLLOW GLASS CYLINDERS.
APPLICATION FILED JULY 24, 1915.

1,295,348.

Patented Feb. 25, 1919.

WITNESSES
R. A. Balderson
W. C. Lyon

INVENTOR
Wm L. Monro
by Bakewell, Byrnes Parmelee
Attys.

UNITED STATES PATENT OFFICE.

WILLIAM L. MONRO, OF PITTSBURGH, PENNSYLVANIA, ASSIGNOR TO WINDOW GLASS MACHINE COMPANY, OF PITTSBURGH, PENNSYLVANIA, A CORPORATION OF NEW JERSEY.

METHOD OF DRAWING HOLLOW GLASS CYLINDERS.

1,295,348.   Specification of Letters Patent.   Patented Feb. 25, 1919.

Application filed July 24, 1915. Serial No. 41,686.

*To all whom it may concern:*

Be it known that I, WILLIAM L. MONRO, a citizen of the United States, residing at Pittsburgh, in the county of Allegheny and State of Pennsylvania, have invented a new and useful Improvement in Methods of Drawing Hollow Glass Cylinders, of which the following is a full, clear, and exact description, reference being had to the accompanying drawings, forming part of this specification, in which—

Figure 1:
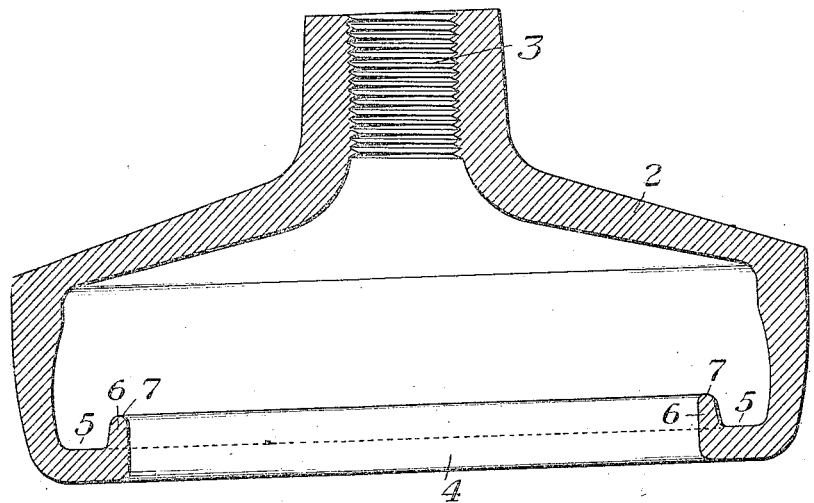
Figure 2:
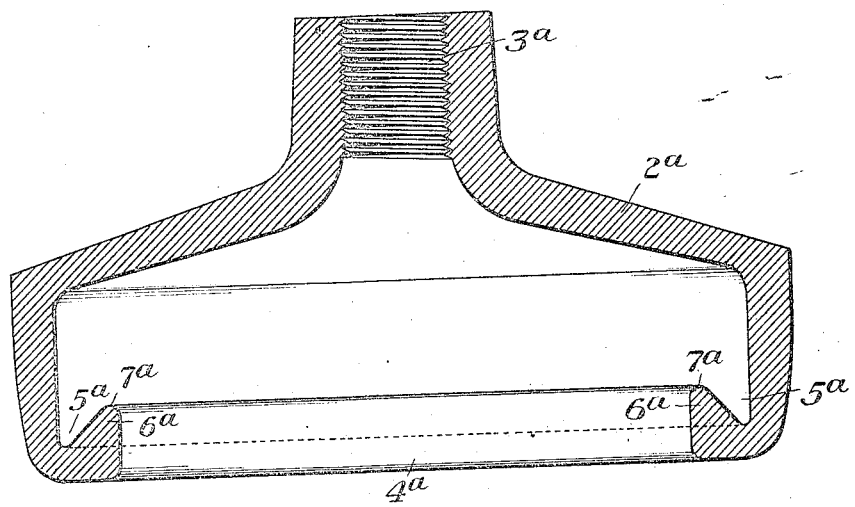

Figures 1 and 2 are vertical sections showing two different forms of baits embodying my invention.

My invention relates to the method of drawing hollow glass cylinders by the use of cold baits. By the term "cold bait" as used herein and in the appended claims, I refer to a bait which may be either cool or somewhat heated, but which will in all cases be immersed in a glass bath in drawing at a temperature very considerably below that at which there will be fusion between the molten glass and the metal of the bait.

Prior to my invention, in the use of baits of this character, it was supposed that the anchorage groove or surface of the bait by means of which the novel is formed and the article supported during the draw, must have very little if any reverse inclination. It was thought that any reverse inclination of this surface so as to give it a pronounced form would cause breakage of the glass due to the different coefficients of expansion of the glass and the metal or alloy of which the bait is composed. I have discovered, however, that such is not the case and that the baits may be provided with anchorage grooves whose inner wall is at any angle to the horizontal up to 90° or thereabout; and that such baits may be employed to advantage without any greater degree of breakage of the glass than with the forms heretofore used.

There is distinct advantage in the use of baits of the type provided by my invention, since the hook-form of the anchorage gives a better and more positive grip of the glass and fewer cylinders are lost by slippage of the bait from the glass.

In Fig. 1, I have shown a form of my invention in which the bait 2 is of the usual hollow cylindrical form, of cast iron, or other suitable metal or alloy, with the threaded connection 3 for attachment to the usual air supply pipe for delivering air to the interior of the bait and to the article during drawing. The bait has a cylindrical opening 4 at its lower end which is surrounded by the annular anchorage or groove 5 whose inner wall 6 projects backwardly within the interior of the bait at an angle of substantially 90° to the horizontal. Preferably the upper edge portion 7 of the flange 6 is somewhat rounded or convexed.

In Fig. 2 I have shown the bait 2ª of generally similar form to that shown in Fig. 1, but in which the inner wall 6ª of the anchorage groove or recess 5ª is at an angle of approximately 45° to the horizontal.

My improved baits may be used in any of the usual methods practised in drawing glass by the cold bait process; the baits being immersed in the molten bath at a temperature below that at which the glass will fuse to the metal, and after being held in the bath for a sufficient length of time to allow a novel to form in the anchorage, but not sufficient to cause the bait to be heated to a temperature at which fusion to the glass will occur; the bait is then slowly raised in the usual manner. A slight amount of air may be admitted into the bait while the novel is being formed; but the air supply may be controlled in any usual or suitable way, according to the shape of the cap portion of the article which the drawer desires to form.

I have found that by the use of cold baits such as described, a glass novel will be formed in the bait groove by the chilling action of the metal, which will not pull out or slip during the drawing, and which is, nevertheless, free of strains of a character to cause breakage.

I do not limit myself to the two particular forms of anchorage grooves which I have herein described, as various forms of such grooves may be employed without departing from the spirit and scope of my invention, as defined in the appended claims.

I claim:

1. In the art of drawing hollow glass cylinders, the method which consists in immersing in the molten glass a hollow bait which is of a temperature below that at which molten glass will fuse thereto, and which has an internal grooved flange whose inner wall is at an angle of at least 45 degrees to the horizontal, and holding the bait in or adjacent to the molten glass for a sufficient period of time to cause the glass in said groove to chill therein to form a novel having a positive reverse hook engagement into the bait but which is not fused thereto, and then drawing the positive hook engagement between the glass and the bait acting to prevent any substantial radial shrinkage of the novel, substantially as described.

2. In the art of drawing hollow glass cylinders the method which consists in immersing in the molten glass a hollow bait which is of a temperature below that at which molten glass will fuse thereto and which has an internal grooved flange surrounding an unobstructed circular opening, the inner wall of the said flange being at an angle of at least 45 degrees to the horizontal, and holding the bait in or adjacent to the molten glass for a sufficient period of time to cause the glass in said groove to chill therein to form a novel having a positive reverse hook engagement into the bait but which is not fused thereto, and then drawing, the positive hook engagement between the glass and the bait acting to prevent any substantial radial shrinkage of the novel, substantially as described.

3. In the art of drawing hollow glass cylinders, the method which consists in immersing in the molten glass a hollow bait which is at a temperature below that at which molten glass will fuse thereto and which has a novel-supporting surface surrounding an unobstructed circular opening, the novel supporting surface having anchorage means, the anchorage surface of which is at an angle of more than 45 degrees to the horizontal and arranged to prevent radial shrinkage of the novel, and holding the bait in or adjacent to the molten glass for a sufficient period of time to cause the glass in said groove to chill therein to form a novel having a positive reverse hook engagement into the bait but which is not fused thereto, and then drawing, the positive hook engagement between the glass and the bait acting to prevent any substantial radial shrinkage of the novel, substantially as described.

In testimony whereof I have hereunto set my hand.

WILLIAM L. MONRO.

Witnesses:
ROBT. J. WHALEN,
ALBERT L. SWIFT.